Feb. 19, 1946.  L. J. CARON  2,395,100
INJECTION MOLDING MACHINE
Filed April 10, 1944  2 Sheets-Sheet 1

INVENTOR.
LUDGER J. CARON
BY Charles R. Fay
  atty.

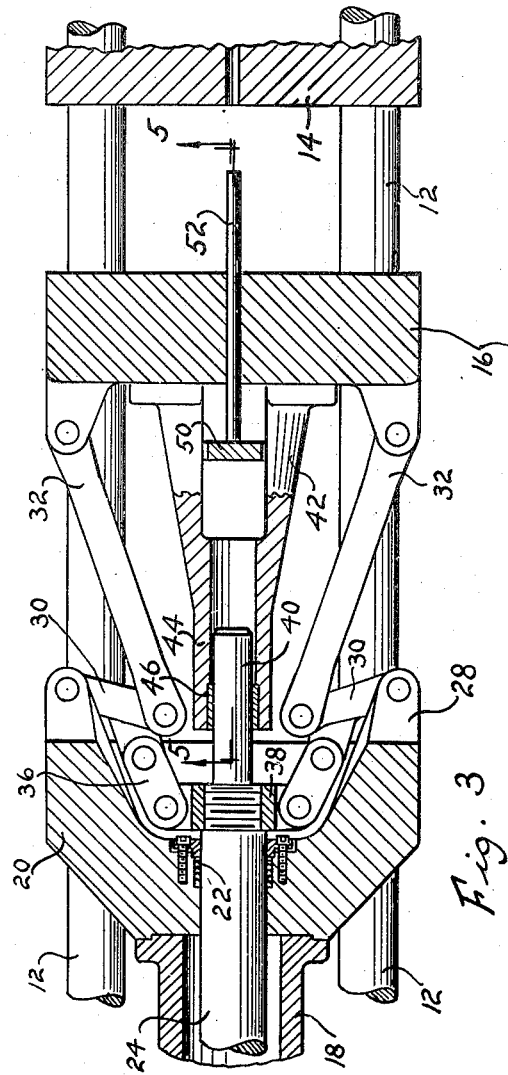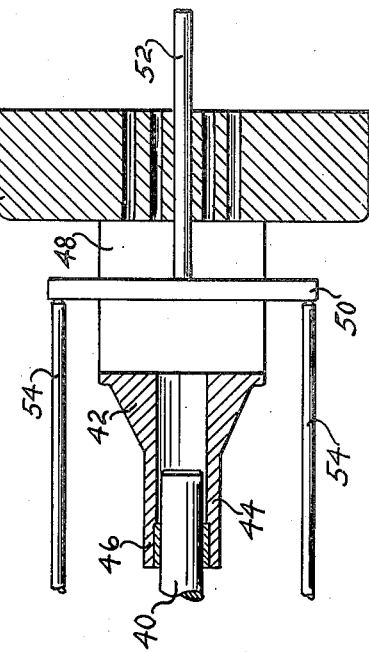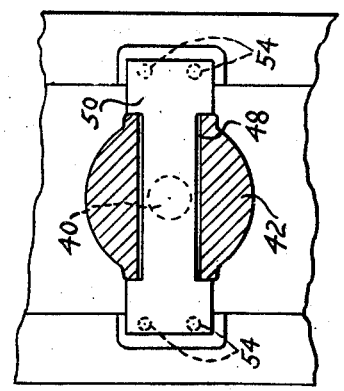

Patented Feb. 19, 1946

2,395,100

UNITED STATES PATENT OFFICE 2,395,100

INJECTION MOLDING MACHINE

Ludger J. Caron, Leominster, Mass., assignor to Leominster Tool Co., Inc., Leominster, Mass., a corporation of Massachusetts Application April 10, 1944, Serial No. 530,378

7 Claims. (Cl. 18—16)

This invention relates to improvements in plastic injection molding machines.

Objects of the invention include the provision of cooperating means associated with the movable platen of the machine and the piston rod of the platen closing cylinder to maintain the movable platen exactly in parallel with the fixed platen so as to prevent deflection of the former during the injection and at the same time to prevent deflection or whip of the piston rod at all times and also to hold the toggles in true alignment, thus insuring smooth trouble-free operation of the machine, eliminating spoiled molded articles, preventing breakage of the piston rod, and obtaining proper closure of the platens for perfect molding.

Further objects of the invention include the provision of an improved pin-type mold ejector.

Other objects and advantages of the invention will appear hereinafter.

Reference is to be had to the accompanying drawings, in which

Fig. 3 is a view similar to Fig. 2 showing the platens open;

Fig. 4 is a section on line 4—4 of Fig. 1; and

Fig. 5 is a detail view showing the operation of the ejector.

Figure 1:
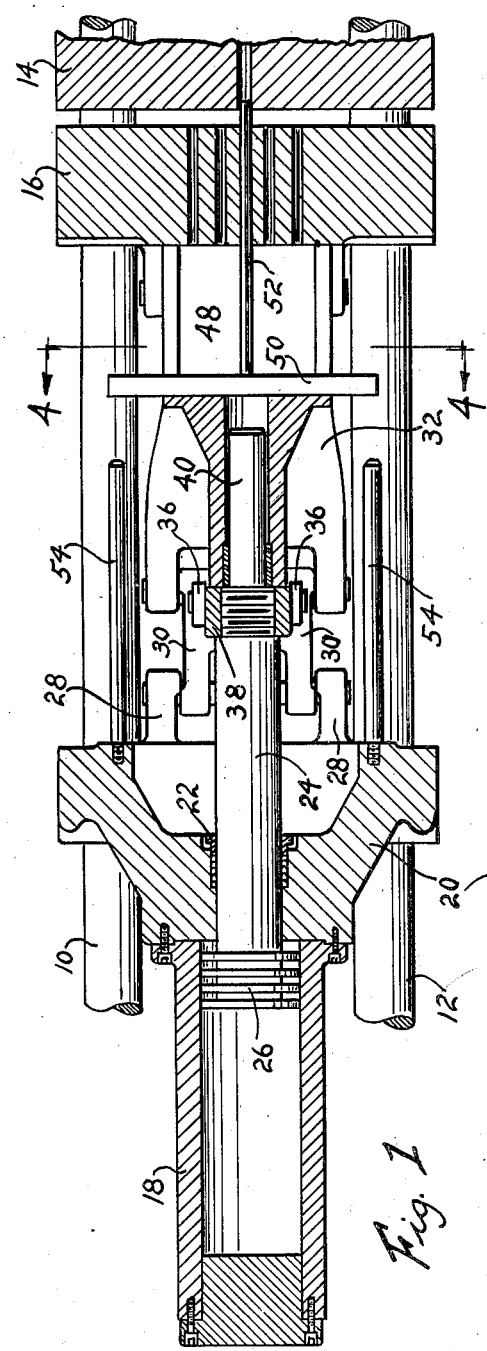
Fig. 1 is a longitudinal vertical section through the pertinent parts of the new injection molding machine showing the platens closed.

In the prior art plastic injection molding machines have had the deficiencies of deflection of the movable platen thus preventing flat parallel closing, which is detrimental to good molding and injurious to the dies, and of deflection of the toggles and piston rod which causes crystallization and breakage of the piston rod. This invention does away with these deficiencies and greatly improves the operation of the machine and increases the length of life of the parts of the machine and of the dies.

In the drawings only so much is illustrated as will clearly disclose the invention. Top rods 10 and bottom rods 12 are fixedly mounted on appropriate bases of any convenient design, and these rods support the fixed platen 14 as well as providing supporting guides for the movable platen 16. A motor cylinder 18 is secured to and may be mounted on a fixed vertical plate 20 having a bearing 22 for piston rod 24 connected to a piston 26 in the cylinder. Forwardly extending bosses 28 provide pivot connections for short links 30 forming toggles with longer links or arms 32. The latter are pivoted to the rear face of the movable platen 16, the short links 30 being provided with bosses 34 forming pivots for links 36 extending toward the center of the machine.

Figure 2:
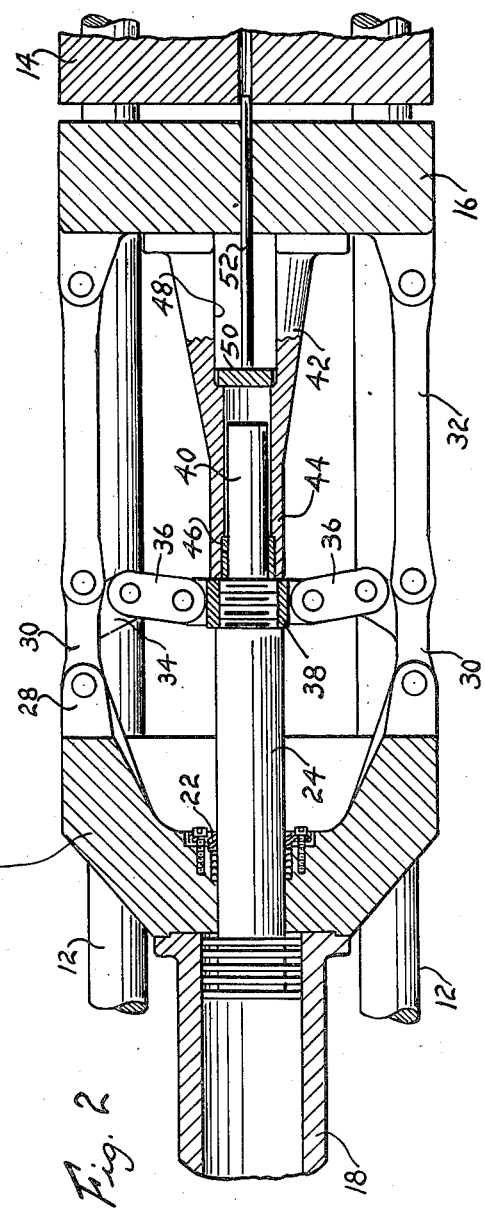
Fig. 2 is a longitudinal horizontal section showing the parts of Fig. 1 with the platens closed.

A trunnion 38 is secured to the forward end of the piston rod by any convenient means such as by screw threads as shown, and this trunnion pivotally connects links 36 with the piston rod for operation of the toggles thereby. The toggles are locked open in the Fig. 1 and Fig. 2 position, but this does not prevent deflection of the movable platen or of the piston rod. A continuation of the piston rod, or an element secured thereto, as shown at 40, extends forwardly thereof for a purpose to be described.

Secured to the rear face of the movable platen 16 there is a supporting bracket 42 extending rearwardly into the area of the element 40. The supporting bracket is provided with a rearwardly open cylinder 44, having a sleeve bearing 46 to closely slidably receive the element 40 as shown.

The supporting bracket is also provided with a vertical slot at 48 which forms a guide for an ejector plate 50 having one or more ejector pins 52 secured thereto. The ejector plate rides in the slot 48 and is stopped in its rearward movement therewith by bumper pins 54 secured to any convenient part of the machine and extending forwardly as shown.

In the operation of the machine, the ejector pin 52 operates as the movable platen opens under influence of the toggles on the return stroke of the piston rod 24. However, the movable platen continues rearwardly, the engagement of element 40 and the cylinder 44 being continuous. Clearly the cylinder 44 prevents the piston rod from any tendency to deflect, at all times, although the latter moves in a greater range than the movable platen and supporting bracket 42, as measured by the distance between the trunnion 38 and the end of cylinder 44 in Fig. 3, also, the toggles themselves are always maintained in true alignment, as well as the piston, by this construction, so that they move exactly as designed.

As the piston rod moves on the closing stroke, the ejection plate is picked up and moved forwardly with platen 16. As the dies close, the trunnion 38 strikes the end of the supporting bracket, see Figs. 1 and 2, and since the trunnion is backed by the piston pressure, it forces the platen 16 to close in correct relation to platen 14, and stops any possible deflection so that the dies will close perfectly.

Having thus described my invention and the advantages thereof, I do not wish to be limited to the details herein disclosed, otherwise than as set forth in the claims, but what I claim is:

1. In an apparatus of the class described, a pair of relatively movable platens, a cylinder and piston, a toggle associated with the piston and one of said platens for moving the latter by means of the piston, and means fixed to said one platen for slidably engaging and guiding the piston and maintaining the latter against deflection.

2. An injection molding machine having a fixed and a movable platen, a cylinder and piston for moving the movable platen toward the fixed platen, a trunnion on and intermediate the ends of the piston, toggles connected to the trunnion and movable platen, a guiding bracket for the piston extending from the movable platen, said trunnion impinging on the bracket as the platens close so that the piston exerts pressure directly on the movable platen without contacting the latter at the end of the stroke of the piston.

3. An injection molding machine comprising a pair of relatively movable platens, a cylinder and piston for moving one of the platens, toggles connected between the piston and said one platen, a bracket on the latter for impingement thereon by the piston at a predetermined point in the movement thereof, an ejection plate slidably carried by the bracket, means for striking and stopping the plate during the retraction of the piston and said one platen, and guide means on the bracket slidably receiving the piston to aid in preventing deflection of the one platen during movement of the latter.

4. An injection molding machine comprising a pair of relatively movable platens, a cylinder and piston for moving one of the platens, toggles connected between the piston and said one platen, a bracket on the latter, an extension on the piston, guide means on the bracket for slidably receiving the extension, an ejection plate slidably carried on the bracket and means for striking and stopping the plate during the retraction of the piston and said one platen.

5. Injection molding machine comprising a pair of relatively movable platens, a cylinder and piston for moving one of the platens, a piston rod, toggle mechanism operated by the piston rod to so move the one platen, a bracket on the rearward surface of said platen, said bracket being secured thereto at spaced points thereon, a rearwardly extending guide on the bracket, said guide receiving the piston rod and maintaining the latter against deflection.

6. The injection molding machine of claim 5 including means impinging on the bracket and exerting pressure thereon at the point of closure of the platens.

7. Injection molding machine comprising a pair of relatively movable platens, toggle mechanism associated with one platen to move the same, a reciprocable rod connected to the toggle mechanism to operate the latter, a bracket on the one platen, said bracket being secured thereto at spaced points thereon, an elongated guideway on the bracket receiving the rod to prevent lateral deflection thereof, said guideway being of length sufficient to provide a head space for the rod at all times so that the rod is always free of the bracket and platen in a longitudinal direction, and means secured to the rod and exerting pressure on the bracket at the point of closure of the platens, said bracket transmitting the pressure to said spaced points to preserve the alignment of said one platen at the point of closure.

LUDGER J. CARON.